United States Patent [19]

Siebert

[11] Patent Number: 4,510,171

[45] Date of Patent: Apr. 9, 1985

[54] CLAD METAL JOINT CLOSURE

[75] Inventor: Oliver W. Siebert, Manchester, Mo.

[73] Assignee: Monsanto Company, St. Louis, Mo.

[21] Appl. No.: 616,093

[22] Filed: Jun. 1, 1984

Related U.S. Application Data

[62] Division of Ser. No. 301,340, Sep. 11, 1981, Pat. No. 4,459,062.

[51] Int. Cl.³ .............................................. B05D 1/10
[52] U.S. Cl. ................................. 427/34; 228/165; 228/178; 228/187; 228/199; 228/214; 228/226; 427/423
[58] Field of Search ................... 427/34, 423; 219/121 PL; 228/199, 214, 178, 165, 186, 187, 190, 226

[56] References Cited

U.S. PATENT DOCUMENTS

| | | | |
|---|---|---|---|
| 1,842,298 | 1/1932 | Smith | 228/214 |
| 2,054,939 | 9/1936 | Larson | 228/226 |
| 2,209,290 | 7/1940 | Watts | 228/226 |
| 2,249,723 | 7/1941 | Orr | 29/458 |
| 3,016,447 | 1/1962 | Gage et al. | 219/76.15 |
| 3,170,227 | 2/1965 | Richmond et al. | 228/214 |
| 3,289,293 | 12/1966 | Stenquist et al. | 228/214 |
| 3,312,566 | 4/1967 | Winzeler et al. | 427/34 |
| 3,443,306 | 5/1969 | Meyer | 228/165 |
| 3,769,689 | 11/1973 | Little | 228/199 |
| 4,030,848 | 6/1977 | Keifert et al. | 228/165 |
| 4,030,849 | 6/1977 | Keifert et al. | 228/165 |
| 4,032,243 | 6/1977 | Keifert et al. | 228/165 |
| 4,073,427 | 2/1978 | Keifert et al. | 228/187 |
| 4,101,751 | 7/1978 | Urbanic et al. | 219/121 PJ |
| 4,113,167 | 9/1978 | Komiyama et al. | 228/199 |
| 4,142,664 | 3/1979 | Feige | 228/187 |
| 4,325,994 | 4/1982 | Kitashima et al. | 427/34 |

Primary Examiner—John H. Newsome
Attorney, Agent, or Firm—Dennis R. Hoerner, Jr.; James W. Williams, Jr.

[57] ABSTRACT

A plasma arc spray overlay of cladding metals is used over joints between clad metal pieces to provide a continuous cladding metal surface. The technique permits applying an overlay of a high melting point cladding metal to a cladding metal surface without excessive heating of the backing metal.

7 Claims, 3 Drawing Figures

CLAD METAL JOINT CLOSURE

This is a division of application Ser. No. 301,340, filed 9/11/81, now U.S. Pat. No. 4,459,062.

The present invention relates to clad metal weld joints.

BACKGROUND OF THE INVENTION

Clad metals are composite materials made by mill rolling or explosion forming a thin sheet of a metal that has desired properties, over and metallurgically bonded at the interface to a base plate of carbon steel or other backing metals. The composite material has the structural strength of the backing metal and the corrosion resistance, abrasion resistance, or other useful properties on the clad face. In the weld-joining of the clad metal, it is essential to preserve the properties of the cladding at the weld joint. Otherwise, the desired properties of the clad surface would not be continuous. The properties of the backing metal must also be maintained. It is, therefore, necessary to use special weld procedures. In the description herein the term "cladding metal" refers to the metal layer used for its surface properties in the clad metal seal composite, while "backing" metal refers to the layer generally used for its structural properties, or for economy.

In one welding procedure, the structural backing metal such as steel, is fusion welded using steel for the weld, and the cladding metal sheet portion is welded, using the cladding metal material for a seal closure. In such a procedure, the cladding metal seal closure will be contaminated to a certain extent with the backing metal, although there is no good test to determine the degree of contamination, and this may impair its chemical resistance or other desired properties. This is particularly true if the welding of the cladding metal requires welding temperatures well above the melting point of the backing metal. In view of this problem, a cover strip of the cladding metal is often placed over the cladding metal closure weld, and welded at its edges to the cladding metal sheet. This type of joint also has limitations in that the cover strip is subject to fatigue fracture, and there is no satisfactory test to evaluate the integrity of the cover strip attachment weld, which welds often prove inadequate in service. Also the fusion welding procedure for attaching the cover strip will heat up the cladding metal surface layer and the backing layer behind it; if the cladding metal is of much higher melting point, the backing metal will be affected sufficiently to cause contamination of the cladding metal.

In view of the problems encountered in heating the backing metal while welding a surface cladding metal, an interlayer of a heat dissipating metal may be used. The use of such a layer is most common for composites in which the cladding metal is of very high melting point, such as tantalum or nobium, while the structural backing metal has a much lower melting point. In closure joints for such a composite, the surface and interlayers can be machined back from the edges for the pieces to be joined, and the backing metal of the pieces is joined by a fusion structural weld. A filler strip of the clad metal material is then placed in the recess over the structural weld, with the edges of the strip abutting the edges of surface and interlayers of the pieces. A cover strip of the cladding metal is then placed over the filler strip and extending beyond it to be attached to the surface of the cladding metal by welds. Again, there is a problem of the integrity of the welds attaching the cover strips. There is no good inspection method, and failures in some types of service are frequent and expensive. Also, cover strips of some metals, e.g. tantalum and niobium, are often relatively thin and flexible and tend to move up and down with changes in temperature and pressure during use. Such movement can result in fatigue fracture of the attachment weld.

SUMMARY OF THE INVENTION

The invention involves the use of plasma arc spray overlay for protection of joint closures between clad metal parts. The invention further involves a method of making clad metal joint closures in which the backing metal is joined by a welding procedure and the joint is then covered by a plasma-arc spray overlay. In a particular procedure in which there is a layer of a heat dissipating metal between the cladding metal and the base metal, the cladding and heat dissipating metals are stripped back from the edges to be joined, so that the base metal can be welded. An inlay of cladding metal, or cladding metal cover heat dissipating metal, is then placed over the welded joint to fill the void between the edges of the cladding metal on the pieces to be joined. The abutting edges of the cladding metal on the pieces and the inlay are then joined by welding, using cladding metal material in the welding. The entire joint, including the inlay and the clad metal welds, is then protected by a plasma arc spray overlay of the cladding metal material. The method is particularly advantageous for making closure joints where the cladding metal is of very high melting point, such as greater than 5000° F., and of much higher melting point than the backing metal, as in the case of tantalum or niobium over steel. The invention is also directed to the closure joints which result from the above procedures.

BRIEF DESCRIPTION OF THE DRAWING

In the illustrations,

FIG. 1 illustrates the joint closure of the present invention with clad metal members with three layers, while

DETAILED DISCLOSURE OF THE INVENTION

Figure 1:
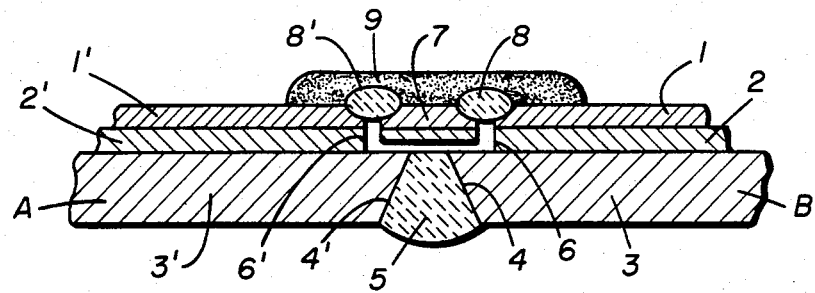

Clad metal pieces are prepared for welding by conventional methods. The cladding metal, e.g. tantalum or tantalum and copper, is machined back from the edge of the backing metal a distance of up to one-half inch or so. Referring to FIG. 1, the members A and B with cladding layers 1 and 1', 2 and 2', and backing structures 3 and 3', with edges 4 and 4', are welded at such edges with weld 5 composed of the backing metal material. The recess between the edges 6 and 6' of the cladding metals is then filled with a filler strip 7 machined to a reasonably close fit between edges 6 and 6'. The edges of the filler strip 7 are then welded with cladding metal seal welds 8 and 8' to edges 6 and 6'. The seal welds 8 and 8' will not generally penetrate below the upper portion of the cladding metals 1 and 1' and will not penetrate to the surface of the backing metal 3 and 3'. Moreover, the welds 8 and 8' need not cover the entire length of the butting edges of the filler strip and clad metals, but may be intermittent or stitch welds, but of sufficient strength to hold the filler strip in place. The entire weld closure is then covered with the cladding metal at 9 using a plasma-arc spray technique. Plasma arc spray equipment and techniques can be used as described in American Welding Handbook, Seventh Edition, Vol. 3, Chapter 12, Plasma Spraying, pages 372 through 375.

In the FIG. 1 illustration, the illustrated closure joint is particularly suitable for composites in which the cladding material 1 is tantalum and niobium, the inner layer 2 is copper, and the backing metal 3 is steel. Silver also has suitable properties to serve as the heat dissipating inner layer 2, but is much more expensive than copper. Aluminum also has heat dissipating capability, but is inferior to copper in its structural properties.

The structure in FIG. 1 can be utilized with titanium or zirconium as the cladding metal 1, but it may be preferable with such metals to leave out the inner layer 2, as titanium and zirconum are not of such high melting points as to require a heat dissipating inner layer. In such a structure, the filler strip 7 can conveniently be a solid titanium or zirconium piece. The clad titanium and zirconium steels can be produced by explosion bonding processes.

Figure 2:
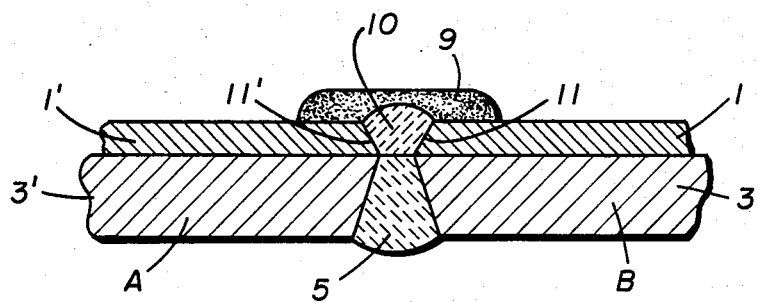
FIG. 2 shows a closure for clad metals with two layers.

A joint which is of more simple construction is illustrated in FIG. 2 in which members A and B have their base metal portions welded at 5 and the cladding metal portions 1 and 1' welded with a weld of cladding metal at 10 welding edges 11 and 11' of the cladding metal layer which are fused to weld 10. The plasma arc spray overlay 9 is then placed over the weld 10 and extending inwardly from the edges 11 and 11' to cover a portion of the cladding metal layers 1 and 1'. This type of joint closure may find use mainly for clad metals in which the cladding metal is not of extremely high melting point so that the main advantage of the plasma arc spray overlay use is the impervious nature of the overlay, rather than the capability of applying the overlay without the excessive heating of the metal.

In a variation of the joint closure illustrated in FIG. 2, the weld 10 is omitted and the pieces are machined so that the edges 11 and 11' of the cladding metal closely abut each other. Then the plasma arc spray overlay 9 can be applied over the joint just as illustrated in FIG. 2.

The plasma arc spray technique is a method whereby a hot gas plasma is used to melt a particulate material and transfer it to a substrate, where it solidifies to become a coating. The plasma is generated by passing the gas between two concentric electrodes (water cooled) where it is heated by a sustained high-current, direct current arc. Temperatures within the chamber can reach higher than 30,000° F., which causes the gas to expand and issue from the front electrodes nozzle of the concentric electrodes at a very high velocity. Down stream from the arc, particulate material, e.g. a powder of cladding metal composition, is injected via a carrier gas and mixed with the plasma. Argon is appropriate as a carrier gas for tantalum. The powder melts and is carried at the gas velocity to the substrate where it is quenched and bonds to the substrate. The plasma-arc spray coatings are characterized as dense, impervious coatings of high bond strength. The coatings lack continuous path porosity and are impervious to gases and liquids. Thus when the cladding metal has chemical resistance to particular agents, the plasma arc-spray overlay provides a good seal against such materials.

The plasma arc spray overlay technique does not ordinarily heat the substrate to very high temperatures. For example, the substrate may typically be heated to only 250° F. Thus, aside from the particular method of achieving the overlay, it is characterized by having very small atomized particles of material, generally well above the fusion point, strike a substrate at very high velocity, and under conditions to cause only limited heat transfer to the substrate. Since the plasma arc involves ionized gas particles, the recombination of such particles utilizes heat, thereby lessening the thermal transfer. Utilizing the plasma arc spray overlay as described herein, the rise in temperature of the substrate can be kept to less than 500 fahrenheit degrees, often less than 300 fahrenheit degrees. While excessive heating of the substrate, and particularly its backing metal components, such as steel, can generally be avoided without difficulty with the plasma arc spray overlay technique as described herein, it will be understood that the speed of the deposition or other factors can, if necessary, be adjusted to avoid excessive heating of a backing material. Thus many steels melt around 2790° F. and it is desirable to keep the temperature of such backing materials well below this level to avoid migration of carbon or other materials therefrom to the cladding metal materials.

In plasma arc spraying, the heat is provided by a non-transferred arc. The arc is maintained between an electrode, usually tungsten, and a constricting nozzle which serves as the other electrode. An inert or reducing gas, under pressure, enters the annular space between the electrodes where it is heated to a very high temperature (above about 30,000° F.). The hot plasma gas passes through and exits from the nozzle as a very high velocity jet. The surfacing material in powder form is injected into the hot gas jet where it is melted and projected onto the substrate.

While plasma arc spraying is particularly useful for coating with materials having melting joints above 5000° F., it can be employed usefully with materials of lower melting point. Metals which can be used include aluminum, chromium, copper, molybdenum, nickel, nickel-chromium alloys, titanium, zirconium, tantalum, niobium and tungsten. Often it is advantageous to use the same metal for the plasma arc spray overlay as employed as the cladding metal in pieces being joined, but other materials compatible with and bonding to the cladding metal can be used. At times it may be advantageous to use mixtures or alloys including the cladding metal as a component. Various ceramics or oxides such as alumina, titania, zirconia, etc. can be used, as well is Cermets, e.g. alumina nickel and zirconia nickel. Mixtures of components can be used in various proportions to produce graded (layered) deposits. In general the plasma arc spray overlay will be of a surfacing material which is compatible with the cladding metal to which it is bonded and which forms an impervious, high density coating and which has desirable properties meeting the requirements for which the cladding metal is employed. In most cases the overlay surfacing material will be selected to have chemical or corrosion resistance or inertness equal to or better than that of the cladding material.

Techniques for electric arc plasma spray coating are at this time well advanced. They characteristically use a gas stream to contain the arc and constrict the gas stream to collimate the energy of the arc and produce a high thermal content effluent or plasma, passing powdered coating material through and with the high thermal content effluent to heat and propel the material and depositing the resulting hot material on a surface to effect its coating. The deposited material forms a sound, dense, adherent surface.

In carrying out the present invention, excessive heating of the cladding surfaces of the clad materials is to be avoided, so procedures should be used which avoid such heating. Among other factors, heating problems are minimized by not having the clad material in the electrical circuit, and can also be controlled by the spacing between the plasma torch orifice and the cladding surface, the gas flow rate, and the application time, or work-piece traverse speed. In any event, the plasma arc spray can readily be utilized in a manner to avoid excesive heating of the cladding surface.

An exemplary procedure for applying material arc spray in implementing the present invention involves concurrently maintaining a high pressure electric arc between a non-consumable stick electrode and a second electrode spaced therefrom, passing a stream of gas in contact with such stick electrode to contain such arc, passing such arc-containing gas stream through an orifice which constricts the gas stream and wall-stabilizes a portion of said arc so as to collimate the energy of said arc and gas stream and produce a high pressure arc and high thermal content effluent, passing powdered material through and with said high thermal contact effluent to produce a high velocity streatm of gas and heated particles, impinging said gas and heated particle stream against the cladding and other surfaces of a joint to be overlayed, thereby depositing the so-heated particles on the surfaces as a dense, coherent mass wherein the deposited particles are bound together. Further details and exemplifications of plasma arc spray coating procedures which are suitable for use herein can be found in Gage et al U.S. Pat. No. 3,016,447, the disclosure of which is incorporated herein by reference.

Various clad materials are old and well known and used frequently in chemical processing equipment which requires great resistance to corrosion. It is typical to use a relatively thin layer of a special purpose metal or alloy to provide resistance to chemical attack; and to use a lower cost, more common base metal or the structurally supporting backing. While fabricable and weldable steels are commonly used as the backing metal, the backing metal can be various steels, including stainless steel, or nickel-base, copper-base, or cobalt-base materials, or a refractory metal or reactive metal having a composition different from that of the facing material. In the usual applications, the cladding layer will be only one side of the base metal, but in some applications the cladding will be on both sides of the base metal, and the joint closure procedures described herein applying a plasma arc spray overlay over the closure can be employed with such doubly coated metal.

Hot mill roll-bonded clad, sometimes called Luken clad, can be employed, and is available with cladding metals including stainless steels, nickel and nickel base alloys, and copper and copper base alloys, and with backing material of carbon or alloy steel. Stainless clad steels are available in gages 3/16 inch to 9½ inches inclusive, and are generally specified in cladding thicknesses between 5 and 20% of the total plate gage, depending upon service conditions. In the production of such clad steels, the cladding metal may be nickel plated prior to rolling in order to aid in bonding to the backing metal, and to serve as a barrier to carbon migration from the backing steel into the cladding.

Alloys useful in hot mill roll bonded clad include:
Chromium stainless steels Types 405, 410, 410S, 430A and 430B
Chromium-Nickel stainless steels Types 304, 304L, 309S, 310S, 316, 316L, 317, 317L, 347, and 318.
Nickel-base alloys Nickel 200 and 201, Monel Alloy 400, Inconel 600
Copper-base alloys 90-10 and 70-30 Cupro-nickel
Copper alloys, ASTM B 152, Copper No. 102 and 122

The backing steel most commonly used is A 285, but other steels which can be used include:
A 515, grades 55, 60, 65, or 70—service requiring high strength.
A 516—for service down to −50 F.
A 204—for higher strength at elevated temperatures.
A 387—for high strength and resistance to hydrogen.
A 302—for high pressure service and elevated temperature service where high tensile strength are essential.

Further description of clad metals. particularly clad steels, and their components is found in Luken Handbook, Steel Plates and Thin Fabrication, pages 251 through 266, the disclosure of which is incorporated herein by reference. The conventional welding aspects of the present invention, including weld edge preparation, etc. can be done as described and illustrated in the cited pages of the Luken Handbook.

A commercial process for explosive bonding of dissimilar alloys in plate form is the Du Pont Detaclad ® process. This process permits the bonding of materials which are not emenable to joining by hot mill rolling, and is, for example, used for the cladding of titanium, zirconium, tantalum and niobium to steel. A description of the process is found in U.S. Pat. No. 3,137,937.

The present invention is of special interest for tantalum clad steels, because of the prominence of such materials and the problems presented in their fabrication. Thus, tantalum has a melting point of about 3000° C. (5430° F.) while mild steel melts at about 1530° C. (2790° F.). Thus in ordinary welding procedures to heat the tantalum to its fusion point, the steel could readily melt and react with the tantalum forming brittle intermetallic compounds. The problems and special conditions involved in fabrication of equipment from tantalum clad steels are further described in U.S. Pat. No. 4,030,849 to H. G. Keifert et al, the disclosure of which is incorporated herein by reference. In particular, the tantalum clad materials useful herein can employ commercially pure unalloyed tantalum, or may use various tantalum alloys, e.g. the Fansteel 63 Metal described in the aforesaid patent.

Clad materials are further described in U.S. Pat. No. 3,443,306 to John J. Meyer, the disclosure of which is incorporated herein by reference. In particular, that patent describes clad materials utilizing a copper interlayer as a heat dissipating layer during welding procedures, and particular welding procedures for such clad materials. One of the objects of the present invention is to provide a method of joining clad material which is an improvement over that of the patent. Tantalum clad materials with a copper interlayer are of special interest for forming joint closures in accord with the present invention, and the clad materials disclosed in the U.S. Pat. No. 3,443,306 are suitable for forming such joint closures. As indicated in the patent, the copper layer is usually of a thickness between 0.050 and 0.070 inch. The conventional welding techniques described and illustrated in the patent can be used for welding the base metal layers in the present invention, or for putting fill materials in the recess above the base metal weld and between the edges of the tantalum and copper layers of the respective pieces being joined. Voids around such filler pieces can, if desired, be filled with silver welds as illustrated in the Meyer patent, prior to applying a plasma arc spray overlay.

The thickness of the inner cladding layer of clad materials can vary widely, but should be sufficient to provide the desired protection of the backing metal and to permit convenient fabrication. With expensive metals such as tantalum, economic considerations militate against unnecessarily thick layers. Tantalum or niobium cladding may, for example, be 0.030 inch thick, and for most uses is apt to be in the range of about 0.025 to about 0.075 inch, or more narrowly, 0.030 to 0.045 inch. A commercially available explosion bonded tantalum on steel clad metal has a tantalum layer of nominal 0.030 inch thickness, but the wavy bond interface between the bonded surfaces makes the actual thickness vary.

Figure 3:
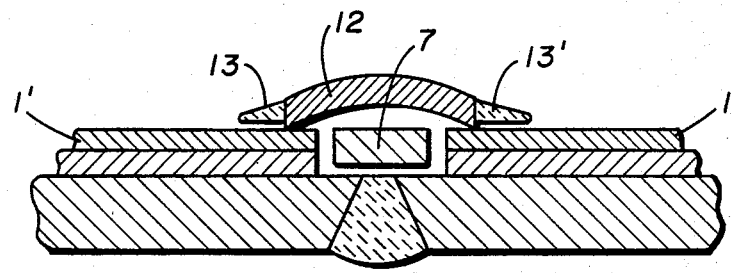
FIG. 3 illustrates a prior art procedure employing batten strips. The Figures will be further described hereinbelow.

The plasma arc spray overlay should extend far enough over the joint and adjacent cladding surfaces to insure a continuous impervious cladding surface and good attachment to the cladding surface. Most overlays will be 2½ to 3 inches or more wide and generally of thickness comparable to or greater than that of the cladding metal layer on the composites being joined. Such thickness will usually be or range upwardly from about 0.050–0.060 inch or so. The plasma arc spray overlay has the advantage of being attached across essentially its entire width to present a good barrier to chemical or other agents contacting a clad metal surface in a reaction vessel or the like. This contrasts with the batten strips used in certain prior art procedures, in which a 2 inch wide batten strip would generally have only about 0.100 inch weld attachment from each edge, and in the case of occasional poor welds might have as little as 0.002 inch of weld attachment. The comparison between the plasma arc spray overlay and the batten strip technique can be visualized by substituting a batten strip for the plasma arc spray overlay 9 in FIG. 1, but with the weld attachment only being on the outer edges of the batten strip and adjacent cladding surface, with the weld attachment constituting no more than about 10% of the batten strip width. This prior art batten strip technique is illustrated in FIG. 3 in which batten strip 12 over filler 7 is attached by welds 13 and 13' to cladding metals 1 and 1'. The other illustrated parts are as in FIG. 1.

As a further example of conventional procedures which can be employed in conjunction with the plasma arc spray overlay in accord with the present invention, reference is made to Keifert et al patent U.S. Pat. No. 4,032,243, the disclosure of which is incorporated herein by reference. As illustrated in that patent, the cladding metal layers can be machined back from edges to be joined and a channel can be cut into the base metal to form a recess for a filler insert. The channel can be cut either before or after welding the base metal portions. Part of the cladding metal layer ends may protrude over portions of the filler insert, and an additional filler piece may be inserted between such ends and welded in place with stitch welds. The stitch welds, additional filler piece, and adjacent portions of the cladding metal layer may then be coated by a plasma arc overlay procedure. The procedure can be employed with metals having only one cladding metal on a backing metal, or with clad metals having an inner layer for heat dissipation or other purposes.

While certain procedures have been illustrated or described herein, it will be recognized that variations can be used without departing from the basic teachings herein. While the invention herein involves a step-wise method to provide impervious closure joints, it will be recognized that conventional techniques are known and available for carrying out a number of the steps. Thus various procedures are known for access to a backer metal, whether one-side or two-side, involving cutting, machinning or stripping back the cladding metal, and cutting V-shaped notches and the like in the backing metal to take a weld, as well as various procedures for putting filler inserts into place. The plasma arc spray overlay technique is used in conjunction with such procedures to apply an impervious coating over the juncture of the joined pieces, aside from the particular structure of the juncture, in a manner which avoids overheating the backing metal, to form a continuous surface of the impervious overlay coating with the cladding metal.

What is claimed is:

1. A method of providing impervious closure joints for clad metals which comprises welding abutting portions of the backing metal layer of pieces of clad metals and applying an impervious coating over the joint between the pieces and over adjacent portions of the surface of the cladding metal layer of such pieces by plasma arc spray.

2. A method of providing an impervious closure joint between clad metal pieces having a cladding metal layer characterized by chemical resistance and another backing metal layer characterized by structural strength which comprises welding the abutting portions of the backing metals, welding the abutting portions of the cladding metal layers, and then applying over the weld of the cladding metal and adjacent portions of the cladding layers, an overlay of chemically resistant material by plasma arc spraying.

3. A method of providing an impervious closure joint for clad metal pieces having a tantalum or niobium layer and a structural steel backing layer which comprises providing such clad metal pieces with a heat dissipating layer between such layers, welding together adjacent portions of the steel backing layer, placing a tantalum or niobium filler strip in any space between the edges of the tantalum or niobium layers and heat dissipating layers of the respective pieces, welding the filler strip in place using tantalum or niobium in the welding to adjacent portions of the tantalum or niobium layers of such pieces, and applying by plasma arc spray an overlay of tantalum or niobium or similarly chemically resistant material over the welds, filler strip and adjacent portions of the tantalum or niobium layer.

4. Method of claim 3 in which the heat dissipating layer is copper.

5. The method of claim 1 in which the cladding metal layer has a melting point over 5000° F., and the backing metal is steel.

6. The method of claim 1 in which the cladding metal is tantalum of about 0.030 to about 0.045 inch thickness, and the overlay is tantalum.

7. A method of joining similar pieces of clad material together in edgewise abutting relation without destroying the properties of said material, said material having a top layer of corrosion resistant material, an intermediate layer, and a base metal layer, said method comprising the steps of cutting back the top and intermediate layers from the edges of each of the pieces to provide a space above the base metal to form a gap to be filled, welding the base metal portions of each piece together in edgewise abutting relation by conventional welding means to form a conventional weld between said base metal portions, filling the space above said base metals and said conventional weld inwardly of the exposed cut edges of the top layer and intermediate layer with corrosion resistant fill material, welding the edges of said fill material to the edges of the top layer material with corrosion resistant welding material, and applying an overlay of corrosion resistant material by plasma arc spray over the fill and its attachment welds and adjacent portions of the top layer to form a continuous surface of corrosion resistant material.

* * * * *